Nov. 4, 1958  C. J. LEISY  2,859,002
AIRFOIL AIRCRAFT INTERCONNECTING BOOM
Filed March 5, 1954  3 Sheets-Sheet 1
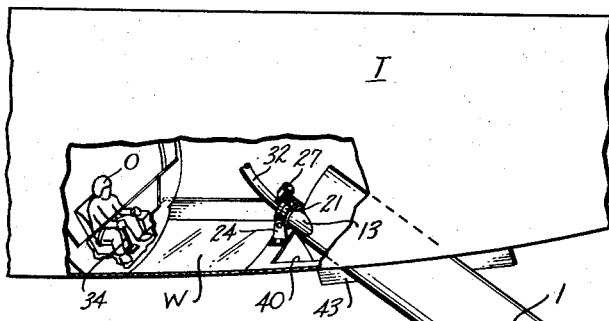
Fig. 1.
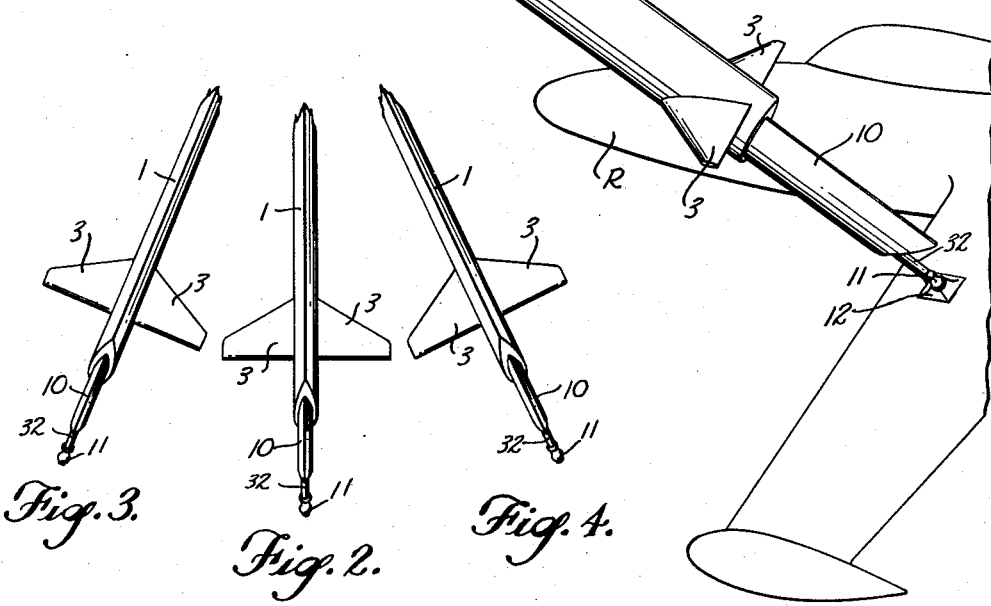
Fig. 3.   Fig. 2.   Fig. 4.
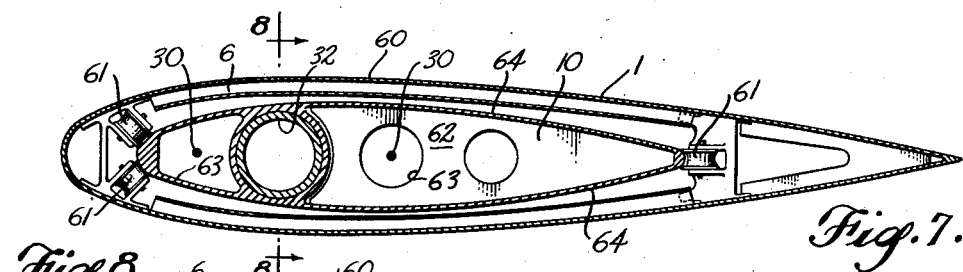
Fig. 7.
Fig. 8.
INVENTOR.
CLIFFORD J. LEISY
BY
Reynolds, Beach & Christensen
ATTORNEYS Nov. 4, 1958  C. J. LEISY  2,859,002
AIRFOIL AIRCRAFT INTERCONNECTING BOOM
Filed March 5, 1954  3 Sheets-Sheet 2
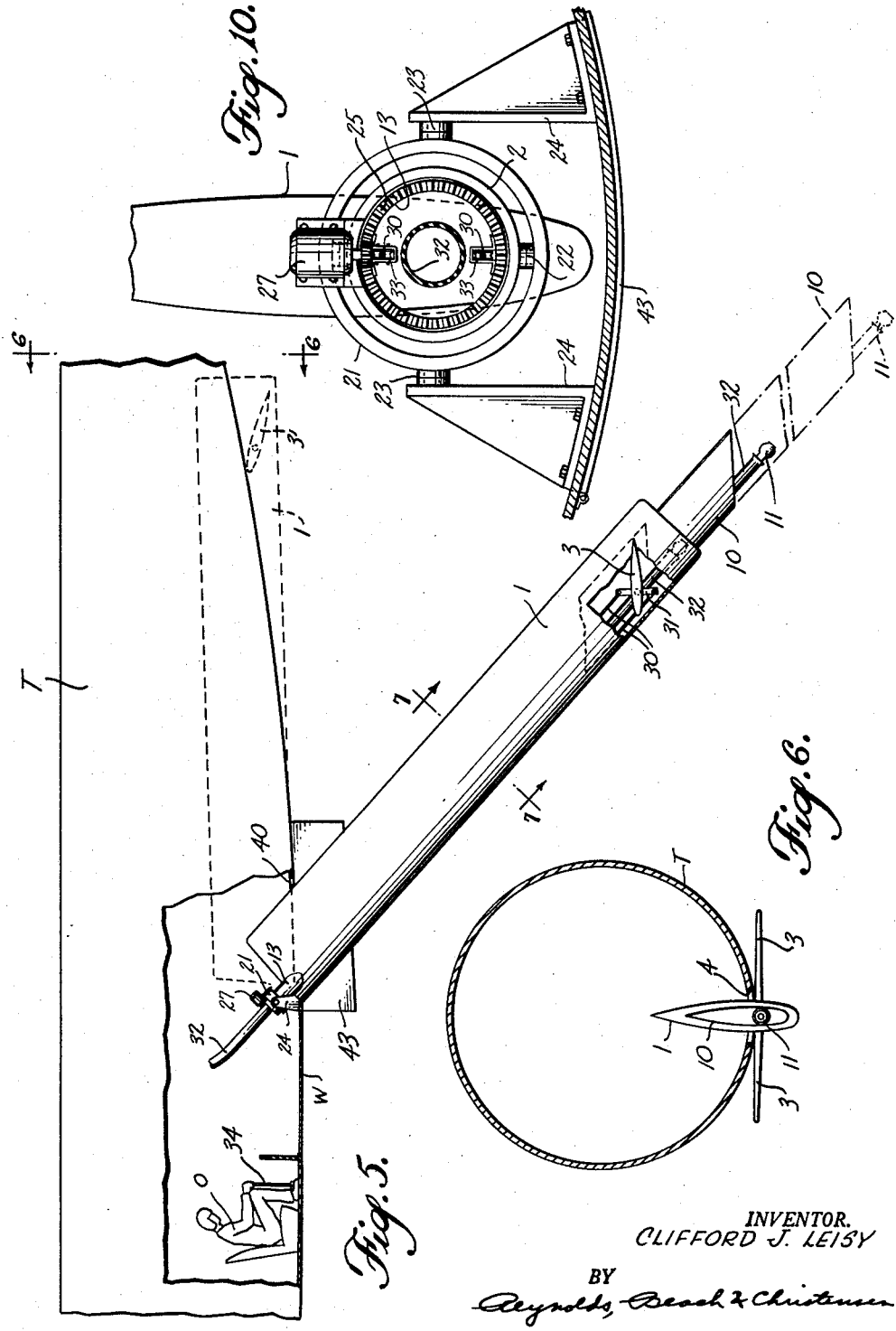
INVENTOR.
CLIFFORD J. LEISY
BY
Reynolds, Beach & Christensen
ATTORNEYS Nov. 4, 1958 C. J. LEISY 2,859,002
AIRFOIL AIRCRAFT INTERCONNECTING BOOM
Filed March 5, 1954 3 Sheets-Sheet 3

INVENTOR.
CLIFFORD J. LEISY
BY
Reynolds, Beach & Christensen
ATTORNEYS

United States Patent Office 2,859,002
Patented Nov. 4, 1958

2,859,002
AIRFOIL AIRCRAFT INTERCONNECTING BOOM

Clifford J. Leisy, Seattle, Wash., assignor to Boeing Airplane Company, Seattle, Wash., a corporation of Delaware Application March 5, 1954, Serial No. 414,330

12 Claims. (Cl. 244—3)

This invention relates to an improvement on the aircraft interconnecting mechanism disclosed in my United States Patent No. 2,663,523 in simplifying the maneuvering of such a boom by making it of airfoil cross section and utilizing aerodynamic forces on such boom to shift it.

The boom of the aforesaid patent incorporated both horizontal and vertical control surfaces requiring two independent sets of control cables extending through the boom to effect movement of such control surfaces respectively. It is an object of the present invention to simplify the control by providing only a single set of control surfaces on the boom and controlling those surfaces for only one type of control movement. Such control movement is a joint turning of oppositely projecting control surfaces, and differential or opposite rotation of such control surfaces, that is, one in one direction and the other in the other direction, is not necessary.

A further object of the invention is to provide such an aircraft interconnecting boom arrangement which can be stored more compactly than the mechanism of my patent mentioned above, and which may be arranged to be received entirely within the aircraft structure if desired when not in use.

Still another object of the invention is to simplify the mounting of such a boom on the aircraft while enabling it to be moved as might be necessary to enable the boom to interconnect aircraft through a reasonable range of different positional relationships.

The representative constructions of interconnecting booms according to the present invention which are shown in the drawings incorporate mechanism for accomplishing the foregoing objects.

It is preferred that an interconnecting boom incorporating two telescoping sections have both sections formed of symmetrical airfoil section. The anchored end of the boom is supported in gimbal ring mechanism enabling the trailing end of the boom to swing universally within limits, and further enabling the boom to turn about its longitudinal axis. The aerodynamic control surfaces carried by the boom rotate about an axis extending transversely of the plane of symmetry of the boom, and the air reaction surfaces may extend perpendicular to such plane of symmetry or may be swept rearward.

Figure 1 is a view showing a portion of a tanker airplane and of the boom carried by it in side prespective view with parts broken away and a portion of a receiver airplane in top perspective view.

Figures 2, 3 and 4 are rear views of the after portion of a boom, Figure 2 representing the boom in central position, Figure 3 showing the boom swung to port, and Figure 4 showing the boom swung to starboard.

Figure 5 is a side elevation view of a portion of the tanker airplane and the boom carried by it, with parts of such airplane being broken away. Figure 6 is a view on line 6—6 of Figure 5 showing the boom in stowed position.

Figure 7 is an enlarged transverse section through the boom on the line 7—7 of Figure 5, and Figure 8 is a fragmentary, longitudinal section through the boom, taken along line 8—8 of Figure 7.

Figure 10 is a view of such supporting mechanism on line 10—10 of Figure 9.

Figure 12:
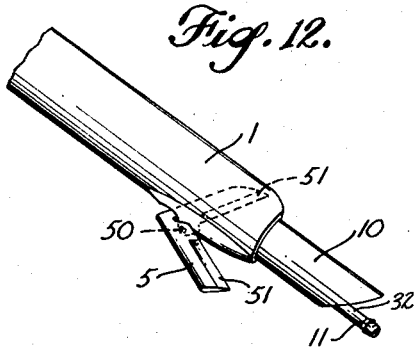
Figure 12 is a fragmentary top perspective view of the trailing portion of a modified type of boom.

In my Patent No. 2,663,523 mentioned above a boom construction for interconnecting aircraft is disclosed, which boom is particularly well adapted for transferring fuel from a tanker airplane to a receiver airplane. The boom of the present invention can be utilized for similar purposes and should be equally maneuverable for such purposes. The principal requirements of maneuverability for such a boom are that it be capable of being adjusted readily in effective length and swingable throughout a substantial range. A convenient construction for this purpose incorporates a tubular boom composed of two lengthwise telescoping parts, the outer part having its forward end mounted on an airplane fuselage, and the inner part being extensible beyond the trailing end of such outer part. The mechanism for effecting relative lengthwise movement of such outer and inner parts may be like that shown in Patent 2,663,523.

The present invention embraces such a telescoping boom, as shown in Figure 1, incorporating the outer part 1 within which the inner part 10 telescopes. The forward end of the outer part 1 is supported from the fuselage of an airplane T, which may be a tanker airplane, and the inner part 10 as shown in Figure 1 is extensible rearwardly from the part 1. A tube 11 carried by the trailing end of the inner boom section 10 is constructed suitably to engage a fitting 12 on another airplane R, which is the receiver airplane. Such a fitting may be located at any convenient place upon such airplane, such as on the wing, as illustrated, or on the fuselage.

In the boom structure disclosed in the aforesaid patent swinging of the boom was effected by air reaction surfaces on the trailing end of the outer boom section. Such control surfaces included an upright control surface, that is, a rudder, and horizontal control surfaces, that is, elevators. The boom of the present invention enables the upright control surface, or rudder, to be eliminated without reducing the facility or versatility of boom control, either for lateral swinging or vertical swinging of the boom relative to the aircraft on which it is supported.

The outer boom section 1, connected directly to the airplane T, and preferably also the inner section 10 of the telescoping boom, are of airfoil cross section. Preferably also such airfoil cross section is of the symmetrical type with the chords of the airfoil sections being in upright planes. As perhaps shown best in Figure 7, the sections 1 and 10 may be of generally similar shape.

To enable aerodynamic forces acting on such a boom of airfoil cross section to effect movement of it as a result of aerodynamic lift forces created on the boom by its movement through the air, the forward end of the boom section 1 is formed as a tube 13 carried by the inner ring 2 of a gimbal ring mounting. The tube 13 and ring 2 are interconnected for relative rotation about their common axis, extending lengthwise of the boom, by an antifriction bearing 20. The inner ring 2 of the gimbal mount is pivotally supported on the outer ring 21 by journals 22 disposed in a plane perpendicular to journals 23 which mount the outer gimbal ring on brackets 24, mounted fixedly in the aircraft. The axis of trunnions 23 extends transversely of the direction of flight and preferably parallel to the lateral axis of the airplane. The axis of pivots 22 would then always be in a plane parallel to the longitudinal axis and the vertical axis of the airplane and perpendicular to the transverse axis of the airplane.

Figure 11:
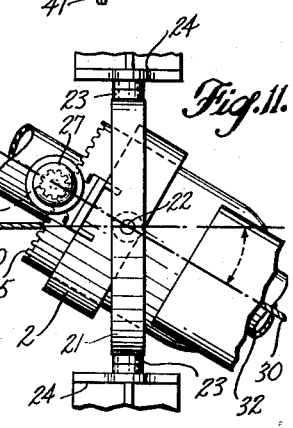
Figure 11 is a view of the supporting mechanism taken on line 11—11 of Figure 9.

Swinging of the outer gimbal ring 21 about the axis of pivots 23 will, of course, enable the boom 1, 10 to swing up and down, and swinging of ring 2 about the axis of pivots 22, as illustrated in Figure 11, will enable the trailing end of the boom to be swung laterally. Universal swinging of the trailing end of the boom is thus made possible by mounting its forward end in the gimbal ring support described, and, in addition, the boom may rotate about its longitudinal axis as tube 13 turns in ring 2. Swinging of the boom upward and downward and lateral swinging of the boom's trailing end are preferably unrestrained, but free rotation of the boom about its longitudinal axis is not desired.

In Figure 2 the trailing portion of the boom is illustrated in a downwardly inclined position with the chords of the symmetrical airfoil sections in a precisely vertical plane. If the tube 13 should be rotated relative to ring 2 in a clockwise direction, as viewed looking forward from a position behind the airplane, the leading edge of the airfoil boom section would be swung to port, and the trailing edge would be swung a greater distance to starboard, assuming that the axis about which such rotation occurs is substantially at the center of lift of the airfoil. In other words, the rotative axis coinciding with the center of tube 13, as shown in Figure 10, might be spaced about twenty-five percent of the airfoil chord from the leading edge.

Such rotation of the boom about its longitudinal axis would produce an aerodynamic lift to port, so that the boom would swing toward the position in which it is shown in Figure 3. Conversely, if the tube 13 were rotated in a counterclockwise direction relative to ring 2, as viewed from behind the airplane, the leading edge of the airfoil boom would rotate somewhat to starboard, and its trailing edge would rotate farther to port. The resulting aerodynamic lift forces would cause the trailing portion of the boom to swing from the position shown in Figure 2 toward that of Figure 4. The distance through which the trailing portion of the boom will be displaced in one direction or the other, as described, will, of course, depend upon the degree of rotation of the boom about its longitudinal axis, because the aerodynamic lift produced by the airfoil section of the boom will be opposed, and in some displaced position will be balanced, by the force of the air stream acting on the boom, as in a weathervane, which tends to align the boom with the direction of relative air flow.

While, as mentioned above, the gimbal ring mounting enables the trailing portion of the boom to swing both laterally and vertically without restraint, the rotation of the boom about its axis must be controllable in order to establish the desired amount of boom swing laterally from the vertical plane parallel to the relative air stream through the gimbal ring mounting of the boom. To effect such controllability a gear 25, which may be somewhat beveled, is formed on the end of the tube 13. With this gear meshes a driving bevel pinion 26 rotatable about an axis perpendicular to the axis of the tube 13 and complementally beveled. This gear is driven by the motor 27, which is reversible and controllable to turn any desired amount. Since this motor is carried by the inner ring 2 of the gimbal mounting, its operation will turn the tube 13 relative to such ring.

Thus lateral swinging of the boom's trailing end in either direction and to the desired degree may be effected by energizing motor 27 to turn pinion 26 and gear 25 the appropriate amount for turning the boom about its longitudinal axis. The rotation of the airfoil boom thus effected, setting the boom at an angle of attack to the relative air stream, will produce the lift necessary to swing the boom about the upright pivots 22. In order to swing the trailing end of the boom vertically, however, the horizontal control surfaces 3, preferably mounted adjacent to the trailing end of the outer forward boom section 1, are utilized. Since the trailing end of the boom can be swung laterally in either direction by the aerodynamic lift produced by the airfoil boom itself, as discussed above, the boom elevating aerodynamic surfaces 3 need only swing conjointly both in the same direction.

Figure 9:
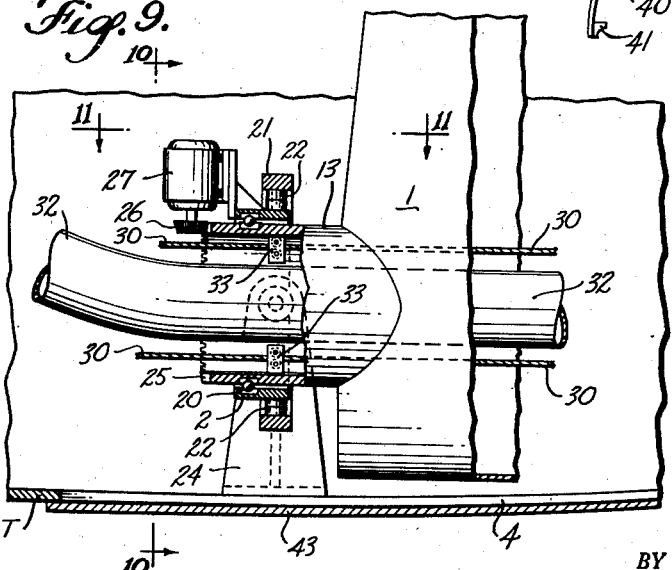
Figure 9 is an enlarged fragmentary side elevation view of a portion of the tanker airplane structure and of the supported end of the boom illustrating the boom supporting mechanism with parts broken away.

Control movement of the boom elevators 3 may be effected by differential movement of cables 30 extending lengthwise through the boom and connected respectively to upper and lower portions of the yoke frame 31 encircling the fuel duct 32 and connected to the pivots of the elevators 3. The control cables 30 may, as shown in Figure 9, pass through guides 33 located in the tube 13 substantially in alignment with the pivots 22. These cables then extend forward through suitable guides to the control column 34 shown in Figure 5, so that as the upper end of the control column is swung rearwardly, the upper stretch of cable 30 will move forwardly and the lower stretch will move rearwardly to decrease the angle of attack of the elevators 3 for depressing the trailing end of the boom. Conversely, if the upper end of the control column 34 is swung forwardly, the upper stretch of cable 30 will be moved rearwardly and the lower stretch forwardly to increase the angle of attack of the elevators 3 for raising the trailing end of the boom.

A suitable power source and electric terminals adjacent to control column 34 in circuit with motor 27 may also be provided. As the control column is swung to one side or the other, the appropriate electrical switch control will be closed to drive motor 27 for effecting swinging of the boom 1, 10 in the appropriate direction, depending upon the direction in which the upper end of the control column is moved. Thus, if the upper end of the control column is swung to port, a switch will be closed for energizing motor 27 to turn the tube 13 counterclockwise as seen in Figure 10 for effecting movement of the trailing end of the boom to port. Alternatively, if the upper end of the control column is swung to starboard, the motor will be energized for turning tube 13 in a clockwise direction as seen in Figure 10, to effect swinging of the trailing end of the boom to starboard.

Depending upon the shape and speed of the airplane on which the boom is mounted, the boom may be stowed in various ways, and the design of the boom elevators may be varied as most appropriate for the particular plan of stowing the boom. In all of the installations shown in the drawings, the gimbal joint supporting the boom is housed within the aircraft such as on the floor of the airplane fuselage T. As shown in Figures 6, 9 and 10, a slot 4 of a width greater than the chord of the boom extends rearwardly from the location of the gimbal joint. This slot preferably is of a length exceeding the length of the boom, so that when the boom elevators 3 are turned to have a sufficiently positive angle of attack, as indicated in broken lines in Figure 5, the trailing end of the boom will be raised by the lift on these elevators to swing the boom edgewise up into the slot 4, as shown in broken lines in Figure 5.

Preferably the elevators 3 are pivoted on an axis extending transversely of the boom at a location approximately coinciding with the boom's center of lift. The pivot will therefore be substantially nearer the boom's leading edge than its trailing edge. When the boom is swung upward, therefore, by far the greater portion of the boom's width may enter the slot 4 in the fuselage, while the elevators 3 remain outside the fuselage, but close to it, as shown in Figure 6. The amount of boom width stowed within the fuselage will be greater if the bottom of the fuselage is curved upward and rearward in the vicinity of the boom, as shown in Figure 5.

Figure 13:
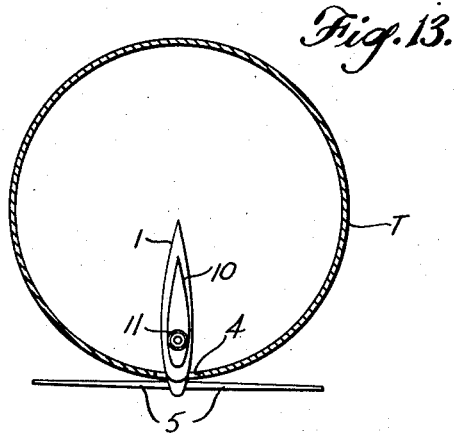
Figure 13 is a transverse section through a tanker airplane fuselage, looking forward, and showing the boom of Figure 12 in stowed position.

For some installations, and particularly those in large tanker airplanes operating at high speed so that the booms are long and heavy, it may be desirable to use the type of boom elevator shown in Figures 12 and 13 instead of that of Figures 5 and 6, for example. Otherwise, the construction and mounting of the boom will be similar to the boom described above. In this instance the chord of the elevator is substantially constant from the center toward the tip, whereas the elevators 3, as shown in Figures 1 to 4, inclusive, are of substantially delta shape in which only the leading edges are swept back and the cross-sectional shape tapers both in thickness and in plan form.

The boom elevators 5 shown in Figures 12 and 13 are shown supported by a pivot mounting 50 adjacent to the leading edge of the boom instead of being swingable about pivots having an axis substantially coinciding with the center of lift of the boom. Such disposition of the boom elevators enables substantially the entire width of the boom to be received through the fuselage slot 4, as shown in Figure 13.

The boom elevators 5 of the modification shown in Figures 12 and 13 are not connected directly to elevator swinging control cables as are the elevators 3 described above. Instead, the oppositely projecting elevators are integral and are pivoted for free pitching movement about the pivot 50. Control of such pitching movement, however, is afforded by altering the effective angle of attack of the elevators. This result is accomplished by swinging relative to the elevators proper tabs 51, which are hingedly mounted on the trailing edges of such elevators. These tabs may be operatively interconnected for conjoint swinging relative to their respective elevators, and suitably connected to a control column 34 such as by control cables like the cables 30 in Figures 5 and 10 so that when the upper end of the control column is swung forward the tabs 51 will be swung upward relative to their elevators 5. Such tab movement in turn will increase the angle of attack of the elevators, thereby increasing the lift of the elevators to effect upward swinging of the boom. Conversely, rearward swinging of the control column 34 will effect downward swinging of the tabs 51 relative to their respective elevators, which will decrease the effective angle of attack of the boom elevators to reduce the lift and swing the boom downward. Suitable mechanism to increase the resistance of the control column to movement corresponding to the displacement of the tabs may be provided, such as spring means or an impact airflow resistance producing device.

Figure 14:
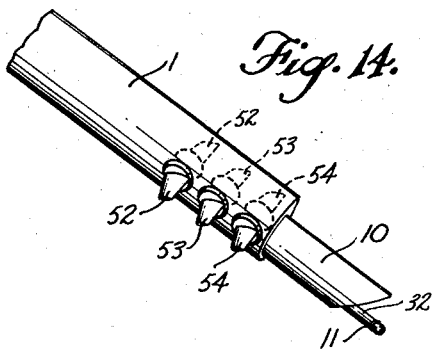
Figure 14 is a top perspective view of the trailing portion of a boom showing another modification.
Figure 15:
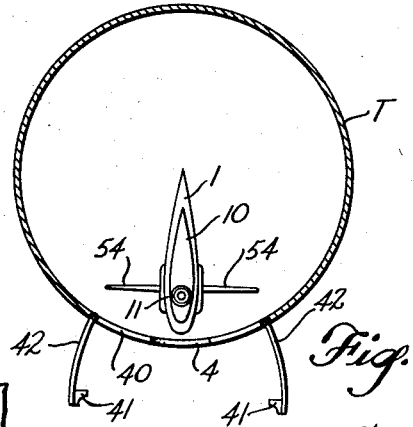
Figure 15 is a transverse sectional view through a tanker airplane fuselage carrying such a boom, looking forward.

For very high speed airplanes it may be desirable to house such a boom entirely within the fuselage of an airplane T when in retracted position. The structure shown in Figures 14 and 15 is capable of such operation. Particularly in high speed airplanes it is desirable to utilize boom control surfaces having a high aspect ratio. If a single pair of high aspect ratio boom elevators is used, however, in order to obtain sufficient lift to swing the boom readily the elevator span is too great to enable the boom elevators to be received conveniently within the fuselage, as will be evident from the relationship between boom elevator span and fuselage width shown in Figures 6 and 13.

To obtain sufficient elevator reaction surface, therefore, utilizing surfaces of reasonably high aspect ratio but short span, a series of pairs of elevators may be employed, pairs of which designated 52, 53 and 54, respectively, are spaced lengthwise along the trailing end of the outer and forward boom section 1, as shown in Figure 14. The proportion between the span of these elevators and the width of the fuselage at a corresponding location is much more favorable for housing the boom completely within the fuselage, as will be evident from the illustration of Figure 15. In this instance a slot 40 is provided in the bottom of the fuselage, which is of a width greater than the span of the boom elevators 52, 53 and 54. The length of such slot will be somewhat greater than the length of the portion of boom section 1 on which the pairs of boom elevators 52, 53 and 54 are mounted. This slot may communicate with a narrower slot 4 extending both fore and aft of slot 40 of a width slightly greater than the width of the outer boom section 1.

Each of the boom elevators 52, 53 and 54 at each side of the boom preferably is supported in cantilever fashion by a rotatable disk on the side of the larger boom section 1, the axis of which preferably is located at approximately the center of lift of the boom. These disks are located reasonably close together but spaced apart far enough to avoid excessive downdraft interference between one elevator and that next behind it. Elevator angle of attack control mechanism such as V belts or chains and sprockets interconnects all of such disks for conjoint rotation in the same sense. This mechanism in turn is suitably connected to the control column 34 such as by control cables like the cables 30 in Figures 5 and 10 so that when the control column is swung rearwardly all of the elevator supporting disks will rotate in a counterclockwise direction, as seen in Figure 14, to decrease their angles of attack for swinging the trailing end of the boom downward. Conversely, when the upper end of the control column is swung forward, the elevator supporting disks will be rotated in a clockwise direction to increase the angle of attack of the elevators for increasing the lift which they produce to swing the trailing end of the boom upward.

This arrangement of boom elevators is particularly advantageous for high speed airplanes, not only because the boom will be housed completely within the fuselage when in stowed position, but the smaller span of such elevators reduces the bending moment at the root of an elevator supported in cantilever fashion. Moreover, supporting the vane root from a disk as described affords a comparatively large support section for the vane area to distribute loads on the vane over a comparatively large supporting structure. Moreover, the small span results in reduced vane drag, and if the outer surfaces of the vane supporting disks are flush with the wall of the boom, a very streamlined vane supporting structure is afforded.

The aerodynamic reaction on the elevators 52, 53 and 54 may be sufficient to swing the trailing end of the boom upward almost entirely into the fuselage, and the last increment of boom movement may be effected by blocks 41 carried by doors 42 hinged at one edge along the respective outer edges of fuselage slot 40. The swinging edges of these doors may be swung toward each other and upward into abutment to close the slot 40, in which position the blocks 41 will engage and support the leading edge of the boom.

Both in this form of the invention and in the other forms, one or more doors 43 such as shown in Figures 5 and 10, for example, may be provided to close part or all of the length of the boom receiving fuselage slot 4. Such doors 42 and 43 may be swung between open and closed positions by suitable actuating mechanism, not shown, and may be latched in closed position.

An important consideration in the design of aircraft mechanism always is the weight of such mechanism. It may appear upon first consideration that a boom of airfoil shape of the type disclosed herein would be undesirably heavy. Actually, however, a boom of the present design is little heavier, if any, than a boom of circular cross section of equal capacity, besides having the advantage of simplicity of air reaction control surfaces discussed above.

In a two-part telescoping boom of the type shown in my patent No. 2,663,523 mentioned above, in which air reaction control surfaces are mounted on the trailing end of the outer boom section, the boom must be stiff enough so that the boom will not bend appreciably between its supported end and the air reaction surfaces which produce a large portion of the lift and lateral displacement forces on the boom. Consequently, especially where the boom is quite long, a thick-walled tubular structure is required to prevent bending of an order which would interfere with the telescopic movement of the inner boom section within the outer boom section.

In the instant design the airfoil shape of cross section forms naturally a boom shape which is quite stiff in a vertical plane, even though it is constructed of light material. Consequently, the downwardly acting weight of the boom between its supporting gimbal joint at one end and the elevators 3 cannot bend the boom appreciably. The outer boom section 1 may have walls constructed of inner corrugated material 6, over which a smooth skin 60 is secured, for example. As shown in Figures 7 and 8, supporting rollers 61 are journaled in spaced relationship within this section to engage and guide the leading and trailing edges of the inner boom section 10.

The inner boom section has the fuel transfer pipe 32 extending lengthwise through it suitably variable in effective length such as being of flexible, corrugated synthetic rubber like the hose 3 of Leisy Patent No. 2,663,523 and supported by ribs 62 having apertures 63 through which the boom elevator control cables 30 extend, at each side of the tube 32. The ribs 62 are covered on opposite sides by smooth skin sections 64.

Even though the thickness of such a boom perpendicular to the chord is less than would be the thickness transversely of the direction of flight of a cylindrical boom, the stiffness of the present boom transversely of the flight direction is adequate. In previous booms the lateral swinging force has been applied by air reaction control surfaces or an air reaction control surface located adjacent to the trailing end of the outer boom section. The concentrated force thus created exerts a very substantial bending moment on the boom. Lateral swinging of the boom described above, however, is effected by an aerodynamic lift produced along the entire length of the boom, so that virtually no bending moment occurs in the boom in a direction transversely of the air foil chord. For that reason the boom structure needs very little stiffness in the direction transversely of the direction of flight.

To control swinging of such a boom it is convenient for the station of the boom operator O to be located somewhat ahead of the boom supporting gimbal joint as shown in Figure 1 and Figure 5. A window W may be located between the operator's station and the boom, through which the operator may view the trailing end of the boom in lowered position, so that he may swing it as may be appropriate for contact of the boom fitting with the fitting on the receiver airplane R.

I claim as my invention:

1. Mechanism for interconnecting a supply aircraft and a receiving aircraft in flight, comprising a boom including an outer tubular member and an inner member received in said outer tubular member, said members being relatively slidable lengthwise thereof, at least one of said members being of airfoil cross section disposed with its chord in a generally upright plane, and means swingably supporting such airfoil cross section member from one of such aircraft with the length of such member extending generally fore and aft but disposed at an angle in a vertical plane to the direction of flight of such aircraft and mounting such member for rotation about an axis extending lengthwise of such member to change its angle of attack relative to the direction of flight of such aircraft and thereby produce an aerodynamic force to swing athwartship the end of said boom remote from the aircraft from which said boom is supported.

2. Mechanism for interconnecting a supply aircraft and a receiving aircraft in flight, comprising a boom including an outer tubular member and an inner member received in said outer tubular member and slidable lengthwise thereof, each of said members being of airfoil cross section symmetrical about a normally vertical plane and having its leading edge downward, and pivot means swingably supporting one end of one of said members from the supply aircraft with the length of said boom extending generally fore and aft but disposed at an angle in a vertical plane to the direction of flight of such supply aircraft and mounting said members for rotation about an axis extending lengthwise of said members to change their angle of attack relative to the direction of flight of such supply aircraft and thereby produce an aerodynamic force to swing athwartship the end of said boom remote from the supply aircraft.

3. Mechanism for interconnecting a supply aircraft and a receiving aircraft in flight, comprising a trailing, longitudinally stiff hollow boom of flattened cross section disposed with its major axis in a generally upright plane, means supporting said boom from one of such aircraft with the length of said boom extending generally fore and aft but disposed at an angle in a vertical plane to the direction of flight of such aircraft and including rotating means guiding said boom for turning about its longitudinal axis and means guiding said boom for athwartship movement of its end remote from the aircraft from which said boom is supported, and turning drive means connected to said boom for turning it about its longitudinal axis to change its angle of attack relative to the direction of flight of such aircraft and thereby produce an aerodynamic force acting transversely of the direction of flight for moving such boom end athwartship.

4. The mechanism defined in claim 3, in which the means guiding the boom for athwartship movement of its end remote from the aircraft from which the boom is supported includes a gimbal joint enabling limited universal swinging of the boom relative to the aircraft from which the boom is supported.

5. The mechanism defined in claim 4, in which the rotative means guiding the boom for turning about its longitudinal axis is carried by the gimbal joint.

6. Mechanism for interconnecting a supply aircraft and a receiving aircraft in flight, comprising a boom including an outer tubular member and an inner member received in said outer tubular member and slidable lengthwise thereof, each of said members being of airfoil cross section symmetrical about a normally vertical plane and having its leading edge downward, and pivot means swingably supporting one end of one of said members from the supply aircraft with the length of said boom extending generally fore and aft but disposed at an angle in a vertical plane to the direction of flight of such supply aircraft and mounting said members for rotation about an axis extending lengthwise of said members to change their angle of attack relative to the direction of flight of such supply aircraft and thereby produce an aerodynamic force to swing athwartship the end of said boom remote from the supply aircraft, elevator air reaction surfaces carried by and projecting laterally from said pivot means supported member at a location spaced longitudinally of said member from said pivot means, and means connected to said elevator air reaction surfaces for swinging them and producing an aerodynamic lift force on said latter member swinging said boom up or down about said pivot means.

7. Mechanism for interconnecting a supply aircraft and a receiving aircraft in flight, comprising a trailing, longitudinally stiff hollow boom of airfoil cross section symmetrical about a normally vertical plane and having its leading edge downward, means supporting the forward end of said boom from the supply aircraft with the length of said boom extending generally fore and aft but disposed at an angle in a vertical plane to the direction of flight of the supply aircraft, including rotative means guiding said boom for turning about its longitudinal axis and pivot means guiding said boom for limited athwartship swinging of its rearward end, and turning drive means connected to said boom for turning it about its longitudinal axis to change the angle of attack of the boom relative to the direction of flight and thereby produce an aerodynamic force acting transversely of the direction of flight and swinging the boom's rearward end athwartship.

8. The mechanism defined in claim 7, in which the pivot means includes a gimbal joint enabling limited universal swinging of the boom's rearward end.

9. The mechanism defined in claim 8, in which the means supporting the forward end of the boom for turning about its longitudinal axis is carried by the gimbal joint.

10. Mechanism for interconnecting a supply aircraft and a receiving aircraft in flight, comprising a trailing, longitudinally stiff hollow boom of airfoil cross section symmetrical about a normally vertical plane and having its leading edge downward, means supporting the forward end of said boom from the supply aircraft with the length of said boom extending generally fore and aft but disposed at an angle in a vertical plane to the direction of flight of the supply aircraft, including rotative means guiding said boom for turning about its longitudinal axis and pivot means guiding said boom for limited universal swinging of its rearward end, turning drive means connected to said boom for turning it about its longitudinal axis to change the angle of attack of the boom relative to the direction of flight and thereby produce an aerodynamic force acting transversely of the direction of flight and swinging the boom's rearward end athwartship about said pivot means, an elevator air reaction surface carried by and extending generally horizontally transversely of said boom, and means operatively connected to said elevator air reaction surface to swing it relative to said boom, producing an aerodynamic force on said boom swinging said boom up or down about said pivot means.

11. Mechanism for interconnecting a supply aircraft and a receiving aircraft in flight, comprising a trailing, longitudinally stiff hollow boom of flattened cross section disposed with its major axis in a generally upright plane, means supporting said boom from one of such aircraft with the length of said boom extending generally fore and aft but disposed at an angle in a vertical plane to the direction of flight of such aircraft and including a gimbal joint enabling universal swinging of said boom relative to the aircraft carrying said supporting means and means guiding said boom for turning about its longitudinal axis, an elevator air reaction surface carried by said boom rearwardly of said supporting means and extending generally horizontally transversely of said boom, lateral control means operable from within the aircraft carrying said supporting means and connected to said boom to rotate it about said means guiding said boom for turning about its longitudinal axis to change the angle of attack of said boom relative to the direction of flight and thereby produce an aerodynamic force acting transversely of the direction of flight and swinging said boom athwartship about said gimbal joint, and vertical control means operable from within the aircraft carrying said supporting means, extending rearwardly through said gimbal joint and connected to said elevator air reaction surface to swing it, producing an aerodynamic force on said boom swinging said boom up or down about said gimbal joint.

12. Mechanism for interconnecting a supply aircraft and a receiving aircraft in flight, comprising a boom including an outer tubular member and an inner member received in said outer member and slidable lengthwise thereof, each of said members being of airfoil cross section symmetrical about a normally vertical plane, and having its leading edge downward, a gimbal joint carried by the supply aircraft, a ring supporting the leading end of said outer tubular member from said gimbal joint with the length of said outer tubular member extending generally fore and aft but disposed at an angle in a vertical plane to the direction of flight of the supply aircraft for turning of said boom about its longitudinal axis, elevator air reaction surfaces carried by and projecting laterally from the trailing end of said outer tubular member, lateral control means operable from within the supply aircraft and connected to said boom to rotate said ring to change the angle of attack of the boom relative to the direction of flight and thereby produce an aerodynamic force acting transversely of the direction of flight and swinging said boom athwartship about said gimbal joint, and vertical control means operable from within the supply aircraft, extending rearwardly through said gimbal joint and outer tubular member and connected to said elevator air reaction surfaces to swing them, producing an aerodynamic lift force on said outer member swinging said boom up or down about said gimbal joint.

References Cited in the file of this patent

UNITED STATES PATENTS

| | | |
|---|---|---|
| 1,104,254 | Eddelbuttel-Reimers | July 21, 1914 |
| 1,274,986 | Carolin | Aug. 6, 1918 |
| 1,408,868 | Dutcher | Mar. 7, 1922 |
| 1,818,834 | Zimmerman | Aug. 11, 1931 |
| 2,385,392 | Van Dusen | Sept. 25, 1945 |
| 2,663,523 | Leisy | Dec. 22, 1953 |
| 2,670,913 | Castor et al. | Mar. 2, 1954 |